No. 721,748. PATENTED MAR. 3, 1903.
J. N. SANBORN.
VALVE.
APPLICATION FILED SEPT. 18, 1902.
NO MODEL.
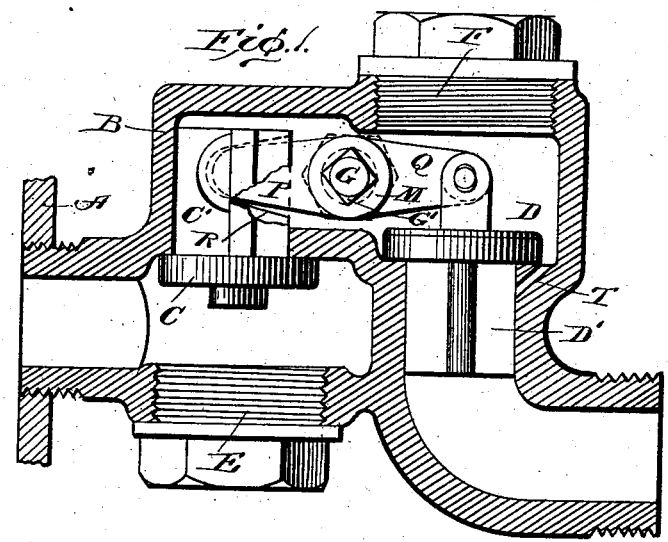
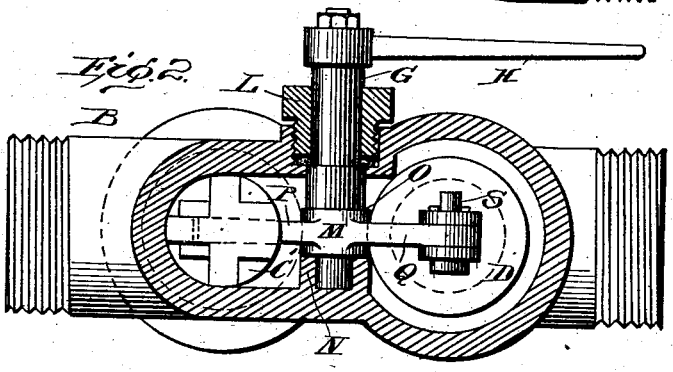
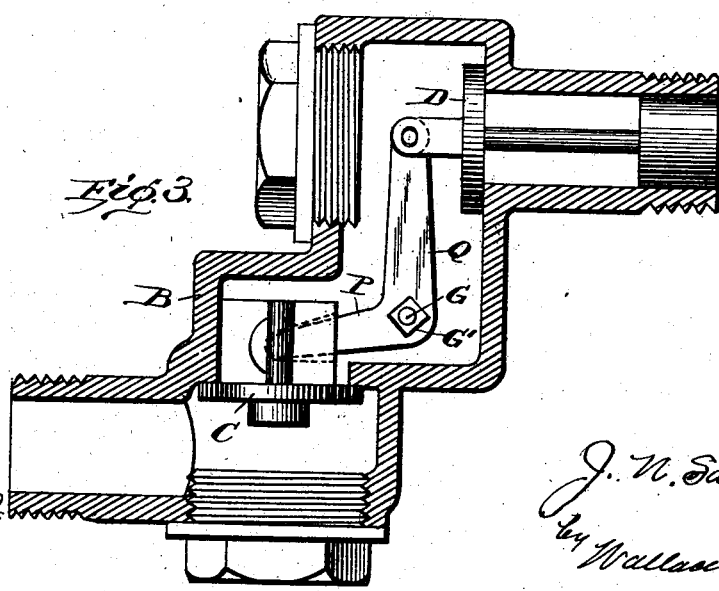
Witnesses
Inventor
J. N. Sanborn
Attorney

UNITED STATES PATENT OFFICE.

JOSHUA N. SANBORN, OF BRAINERD, MINNESOTA.

VALVE.

SPECIFICATION forming part of Letters Patent No. 721,748, dated March 3, 1903.

Application filed September 18, 1902. Serial No. 123,954. (No model.)

*To all whom it may concern:*

Be it known that I, JOSHUA N. SANBORN, a citizen of the United States, residing at Brainerd, in the county of Crow Wing and State of Minnesota, have invented certain new and useful Improvements in Valves; and I do hereby declare the following to be a full, clear, and exact description of the invention, such as will enable others skilled in the art to which it appertains to make and use the same.

My invention relates to improvements in valve mechanism, such as is especially adapted for use in place of the ordinary blow-off valve of steam-boilers, the object being to secure simple and effective devices having advantages over the valves heretofore used. The apparatus involves two consecutive valves in the same passage, the two opening in the same direction, each capable of slight independent opening and adjustment and both simultaneously opened more widely or forcibly closed by a single positively-operating device.

In the accompanying drawings, Figure 1 is an axial section through the valve mechanism and shows it as connected with a boiler. Fig. 2 is a section on the line 2 2, Fig. 1. Fig. 3 is a view similar to Fig. 1, showing a slightly-modified construction.

In the figures, A represents a boiler-shell, and B a valve-casing screwed into an aperture in the same and having at two successive points in the same conduit distinct valve-seats for valves C D, both opening toward the boiler and each preferably guided by a stem or wing C' or D', fitting a cylindrical portion of the conduit, which they normally close. In line with the valves, respectively, the casing has two large openings normally closed by screw-plugs E F and is also formed with bearings for a rock-shaft G, which passes out through one of its walls and is provided without the casing with an arm H, by which it may be rocked in either direction. Means are provided for locking the rock-shaft against longitudinal outward movement, and preferably such means may be a gland L, as shown. Within the casing a non-cylindrical portion G' of the rock-shaft fits a corresponding opening in a hub M, which fills the space between a boss N and a shoulder O of the rock-shaft, and from this hub two arms P Q extend in different directions to form with the hub a single straight or bent lever. The rounded end of one arm fits loosely in an open socket R in the stem of the valve C, while the end of the other arm is pivotally connected with the other valve by means of a similar socket or by a pin S, passing through both members, the opening in one member being elongated or larger than the pin. Owing to the constructions just mentioned, either valve can open slightly or adjust itself to its seat without in the least affecting the other valve or the lever connecting the two. Preferably a small drainage-canal T is provided to prevent the possible accumulation of liquid between the two valves.

Normally both valves are closed, and the first is pressed against its seat by the fluid from the boiler. Should any foreign matter prevent perfect closure of the first valve, the closure of the second will not be thereby affected, the fluid from the boiler merely passing the first valve and then pressing the second against its seat. When the rock-shaft is rocked in the proper direction, however, both valves will be opened simultaneously, giving free passage for fluid from the boiler. When the opening force ceases to act, the valves close automatically; but if by chance either valve should stick or fail to close perfectly it may be forcibly pressed home by rocking the shaft in the proper direction, and it is to be noted that repeated oscillations of the rock-shaft tends strongly to work out any foreign matter that may interfere with proper action of the valves.

Should it be desired to inspect or repair any of the internal parts of the apparatus, the rock-shaft may be drawn outward longitudinally and the two screw-plugs may be removed. It is then a simple matter to slip out the pin S and then remove the connecting-lever and one valve through the one opening and the remaining valve through the other opening. This being done, all the parts may be refitted and replaced.

It may be noted that by combining this valve mechanism with other apparatus where the flow is in the contrary direction the devices serve as an excellent double check-valve having many of the advantages above set forth.

Fig. 3 shows an arrangement not differing from that of the other figures in principle or working; but the two valves are shown as so located that the connecting-lever is bent instead of being straight. In either case the valves are not necessarily in the same plane.

What I claim is—

1. The combination with a valve-casing, of two valves located at successive points in the same passage through the casing and opening in the same direction, and means for at will opening and closing the two valves simultaneously.

2. The combination with a valve-casing, of two valves each arranged for closing the same passage through the casing and both opening in the same direction with reference to flow through said passage, and means for at will applying any desired degree of closing force to the two valves.

3. The combination with a valve-casing, of two valves each arranged for closing the same passage and both opening in the same direction, and means for applying to both valves simultaneously, opening force alternating with any desired degree of closing force.

4. The combination with a valve-casing, of two valves each closing the passage through the casing and both opening in the same direction, means for applying simultaneously to both valves any desired degree of opening or closing force, and means for discharging from the space between the two valves any liquid which may be therein.

5. The combination with a valve-casing having two valve-seats at successive points in the same conduit, of two valves fitting said seats, respectively, and opening in the same direction, a lever having its ends connected to the two valves, respectively, and means for at will rocking the lever upon an axis intermediate its ends.

6. The combination with a valve-casing, of two valves located at successive points in the same passage through the casing and opening in the same direction, a lever having its ends connected to the valves, respectively, by devices allowing slight opening of the valves independent of the movement of the lever, and means for at will rocking the lever about an axis intermediate its ends.

7. The combination with a valve-casing, of two valves located at successive points in the same passage through the casing and opening in the same direction, a rock-shaft mounted in the casing and extending outward through its wall, rigid arms extending from the rock-shaft to the valves, respectively, and connected thereto by devices allowing slight independent movement of the valves, and means for at will oscillating the rock-shaft, substantially as set forth.

In testimony whereof I affix my signature in presence of two witnesses.

JOSHUA N. SANBORN.

Witnesses:
R. G. VALLENTYNE,
J. M. ELDER.